United States Patent [19]

Cozer

[11] Patent Number: 4,896,247

[45] Date of Patent: Jan. 23, 1990

[54] ROBOT VISION COOLING/PROTECTION SYSTEM

[76] Inventor: Calmon S. Cozer, 141-43 71st Ave., Flushing, N.Y. 11367

[21] Appl. No.: 223,517

[22] Filed: Jul. 25, 1988

[51] Int. Cl.$^4$ .............................................. B23K 9/12
[52] U.S. Cl. ............................... 361/385; 219/124.34; 350/253; 350/584; 901/42; 901/47; 165/156; 165/169
[58] Field of Search ................................ 350/253, 584; 219/124.1, 124.21, 124.22, 124.31, 124.32, 124.33, 124.34, 124.4, 124.5, 121.6, 121.84, 130.01; 901/42, 46, 47; 318/577; 382/58–69; 361/382–385; 165/156, 169

[56] References Cited

U.S. PATENT DOCUMENTS

| | | | |
|---|---|---|---|
| 3,730,229 | 5/1973 | D'Onofrio | 165/156 X |
| 4,057,332 | 11/1977 | Brubaker et al. | 350/319 |
| 4,784,491 | 11/1988 | Penney et al. | 356/376 |
| 4,794,223 | 12/1988 | Barkman et al. | 219/124.34 |

Primary Examiner—Derek S. Jennings
Assistant Examiner—David Osborn
Attorney, Agent, or Firm—Darby & Darby

[57] ABSTRACT

The present protective/cooling system includes a housing which contains electronic circuitry and optics for a vision system typically operating in a high temperature, turbulent dust and debris environment. The vision system is located in an inner chamber which is sealed from the surrounding harsh environment. A cooling fluid flows through spiral passages around the inner chamber for drawing heat from the contained vision system. The cooling fluid exits across an optical interface in a spiral flow pattern which enhances both the cleaning ability and the cooling efficiency of the cooling system.

9 Claims, 2 Drawing Sheets

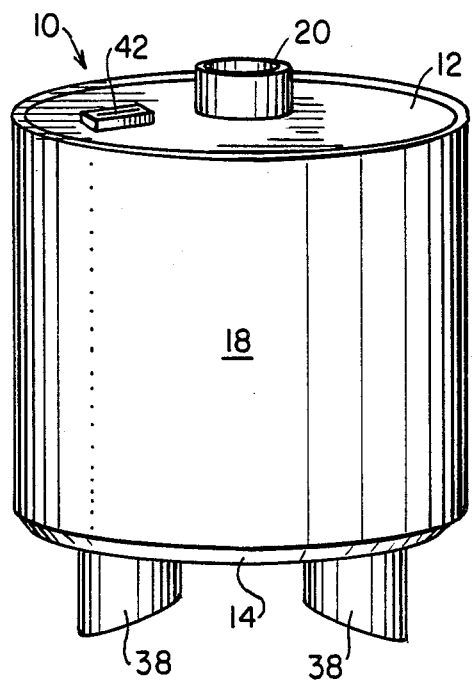
FIG. 1
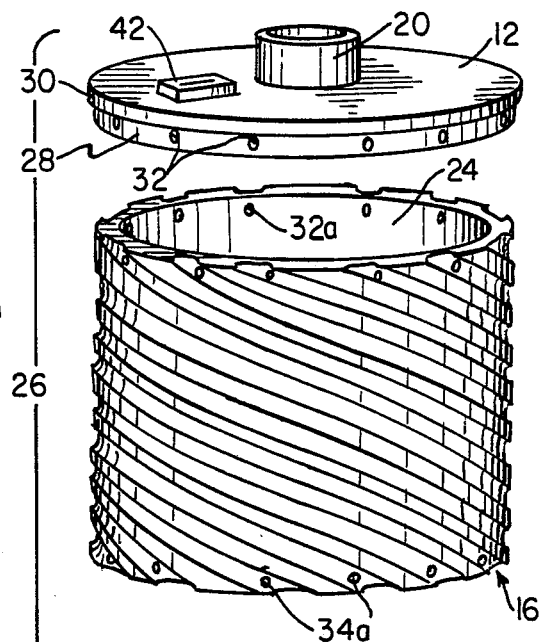
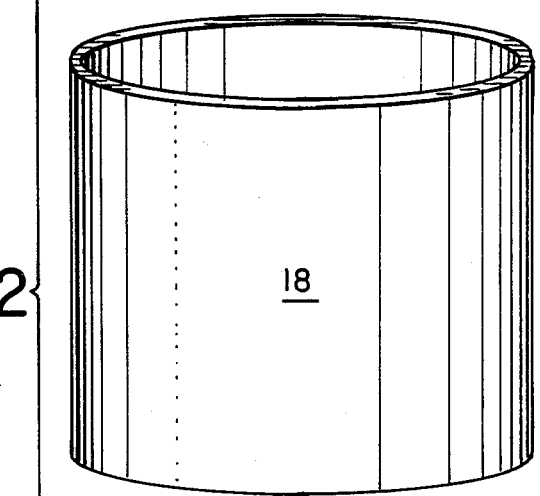
FIG. 2
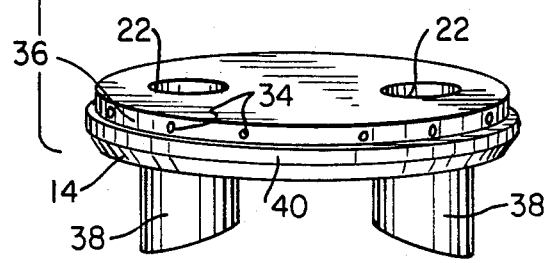

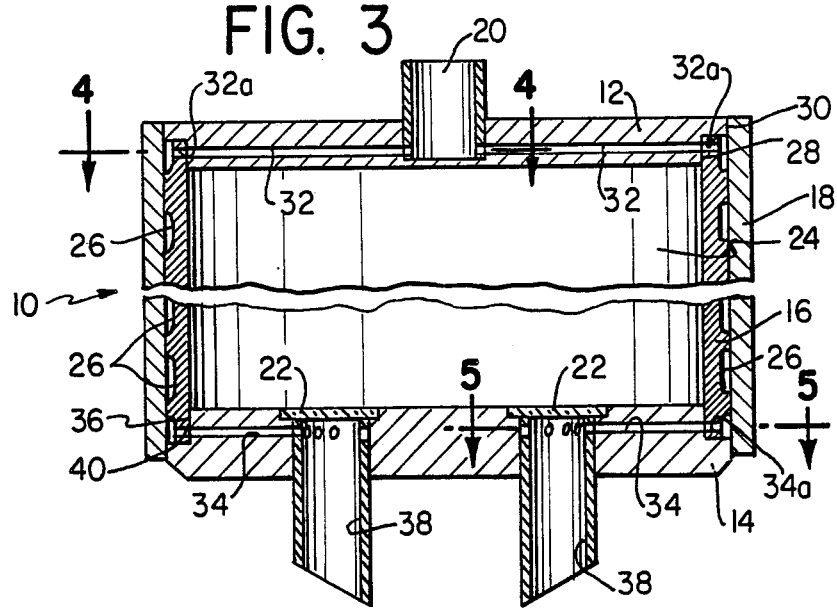
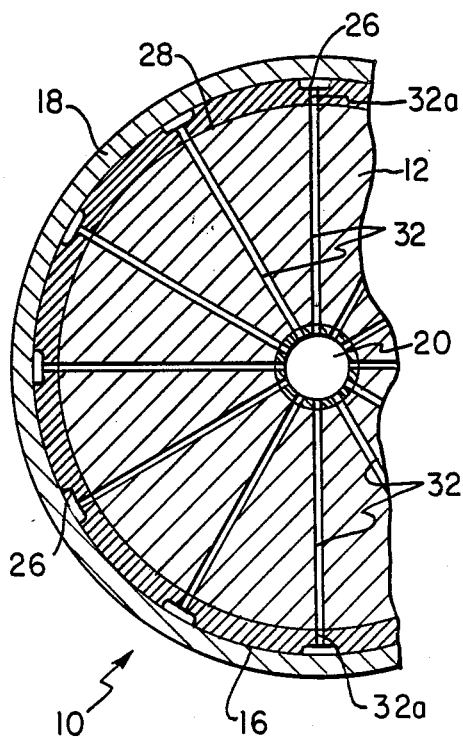 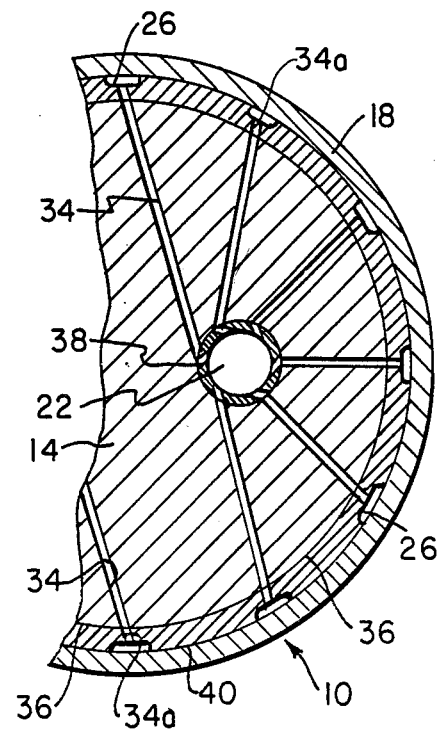

ROBOT VISION COOLING/PROTECTION SYSTEM

The present invention relates to arc welding systems involving vision acquisition opto-electronics and, more particularly, to a system for cooling and otherwise protecting such opto-electronics.

Recent developments in the robotics industry have highlighted the need for accurate vision systems for providing robots, especially automated industrial robots with armature guidance. Typically, these vision systems are located on the robot armature with their optical inputs directed towards the operational end of the armature. In some areas of robotic use, such as automated welding, it is necessary to position the optical input of the vision system within 30 cm of the operational end of the armature to achieve highly accurate guidance. Such accuracy is necessary in automated welding operations (for example) for tracking a welding electrode along a close tolerance seam during a welding procedure.

A problem incurred by placing a vision system close to a welding electrode during welding is that the optical input interface of the vision system, typically a glass plate or lens, becomes subjected to a harsh environment including flying debris and extreme heat radiating from the nearby operating electrode. The vision system electronics, although generally protected from flying debris are also susceptible to damage caused by the extreme heat of the local environment. If debris lands on the surface of the vision system optical input interface, the magnitude of the reflected signals reaching the internal electronic receptors will decrease, lowering the accuracy of the overall vision system.

Any heat related damage done to the vision system electronics might not be readily apparent, causing only a slight drift in alignment accuracy, for example. This slight heat damage to the electronics, if not quickly detected could cause serious manufacturing defects in the final product.

It is therefore essential to ensure that the vision system for armature guidance is adequately protected from both flying debris and high temperatures common in a welding environment.

It is an object of the present invention to provide a structure for the electronics of a robotics vision system in which the adverse effects of heat, combustion products and dust are essentially eliminated.

It is another object of the present invention to provide a unique heat sink construction for removing excessive heat from an enclosed environment in a robot vision system.

Still another object of the present invention is to provide a robot vision system in which a cooling fluid is used to cool the heat sink construction and protect the optical input interfaces against heat, dust and flying debris.

These and other objects of this invention are achieved by providing a housing having an inner chamber for containing opto-electronic circuitry and an optical interface between said inner chamber and the outside environment. The housing comprises an attached double walled, cylindrically shaped heat sink having means forming a plurality of spirally shaped, independent cooling passages within its walls, each spiral passage having an inlet for receiving a cooling fluid and an outlet. The heat sink is such that it draws heat from the housing and transmits the heat to the cooling fluid. The cooling fluid is directed to each inlet of each of the spiral passages from a remote source. The cooling fluid is further directed from the outlet of each spiral passage to flow across at least one face of the optical interface in a spiral motion. The spiral fluid flow both cools the optical interface and the opto-electronic circuitry and prevents particle contamination of the optical interface.

BRIEF DESCRIPTION OF THE DRAWINGS

FIG. 1 is a perspective view of the present invention showing an upper end plate, a lower end plate and an external sleeve;

FIG. 2 is an exploded perspective view of the present invention showing the various parts of the present invention;

FIG. 3 is a cross-section side view of the present invention as assembled;

FIG. 4 is an enlarged partial top view of the upper plate of the present invention as defined by line 4—4 in FIG. 3; and FIG. 5 is an enlarged partial top view of the lower plate of the present invention as defined by line 5—5 in FIG. 3.

DETAILED DESCRIPTION OF THE PREFERRED EMBODIMENT

The structure shown in FIG. 1 is intended for cooling and otherwise protecting any opto-electronics, but has special utility in the field of vision systems for automated welding robot systems.

Referring to FIGS. 2 and 3, the housing 10 of the present invention generally comprises an upper end plate 12, a lower end plate 14, an inner sleeve 16, an outer sleeve 18, a cooling fluid inlet 20 and an optical interface 22. The optical interface is defined as the optical portion which lies between the inside and the outside of a protected sealed chamber 24 shown in FIG. 3. In this preferred embodiment, the optical interface comprises a pair of lenses. The interface could also be a glass plate, or a variety of transparent or translucent windows and/or openings depending on the type of vision system used.

The inner sleeve 16 is preferably made from aluminum because it is both lightweight and high in heat conductivity. As the temperature rises within the protected chamber 24, the inner sleeve 16, acting as a heat sink draws excess heat from the chamber 24, lowering its temperature. A series of independent, spirally arranged fluid passages 26 are routed from top to bottom in the outer surface of the inner sleeve 16. The dimensions of these passages 26 depend on several factors which establish how much heat must be removed from the heat sink inner sleeve 16. These factors include the number of passages used, the temperature of the external (welding) environment, whether additional heat insulators are used (as described below), the material used for the inner and outer sleeves, the flow-speed and initial temperature of the cooling fluid, and the type of cooling fluid used. The spiral passages 26 are preferably wide enough to provide minimum resistance to the fluid flow, yet not so wide that adjacent passages 26 overlap.

Upper and lower sleeve holes 32a, 34a are provided through the inner sleeve. There is an upper and a lower hole 32a, 34a within each spiral passage 26. The upper holes 32a lie adjacent to the upper edge of the inner sleeve 16 and provide entry of cooling fluid into each spiral passage from a corresponding distribution passage 32 of the upper end plate 12. The lower holes 34a lie adjacent to the lower edge of the inner sleeve 16 and provide an exit for the cooling fluid from each spiral passage 26. The cooling fluid exiting through these lower sleeve holes 34a enters the merging tubes 34. When the device is assembled, as described below, the holes 32a, 34a become aligned with the distribution passages 32 of the upper end plate 12 and the merging tubes 34 of the lower end plate 14, respectively.

The inner sleeve 16 is such that it securely fits within the outer sleeve 18. When the two sleeves are coaxially assembled, as shown in FIG. 3, the spiral passages 26 become isolated from each other so that a fluid flowing in one passage will remain flowing in that passage and will not migrate to either adjacent passage. The outer sleeve 18, as further described below can be more permanently attached around the inner sleeve 16 with any conventional adhesive or welding technique so that each spiral passage 26 is completely sealed from each adjacent spiral passage 26.

The outer sleeve 18 is preferably made also from aluminum. Its dimensions vary to match the intended use and the volume of opto-electronics needed to be cooled. The outer sleeve 18 is, however, preferably longer (distance measured between the end plates 12, 14) than the length of the inner sleeve 16.

The upper end plate 12 is similar in shape to a flat round plate which has a circumferential edge surface 28 and an edge flange 30 that extends over the edge surface 28, along the perimeter of the end plate 12. A central fluid inlet 20, through which cooling fluid enters the housing 10 is located in the center of the end plate 12. The inlet 20 is connected to a series of fluid distribution passages 32 which extend from the central fluid inlet 20, directed radially outwardly through the end plate 12 to the edge surface 28. The distribution passages 32 are equal in number to the spiral passages 26 and are arranged along the edge surface 28 to connect with the individual upper sleeve holes 32a and then to each spiral passage 26.

The lower end plate 14 is similar in construction to that of the upper end plate 12. Two lenses 22 are used for the vision system in this preferred embodiment. The lenses 22 are secured in the lower end plate 14 so that optical transmission is provided into and out from the protective chamber 24. The lenses are sealed in the lower end plate 14 so that no gas can flow out from or into the protective chamber 24 around the edge of the lens. The spiral passages 26 connect with individual merging tubes 34 which extend inwardly from an edge surface 36 of the lower end plate 14 to the closer of either lens 22, as shown in FIG. 5. Two lens tunnels 38 provide a glare free window for the vision system and protect the lenses 22 from any flying debris not flying straight towards the lenses. This in itself greatly reduces the amount of debris reaching the lenses. The tunnels 38 also form an outlet for the cooling fluid to flow. The merging tubes 34 merge the fluid from the spiral passages 26 across each lens surface and out through each lens tunnel 38. Half of the merging tubes 34 exit across one lens surface and out through one lens tunnel 38 and the other half across and through the other lens and tunnel, respectively.

The merging tubes 34 do not flow directly towards the center of each respective lens, but are arranged so that a spiral fluid flow is created in the lens tunnels 38. The cooling fluid from each merging tube 34 spirally moves across the surface of each lens and continues this spiral flow in each lens tunnel 38. The exiting fluid generates a spiral shaped turbulent flow away from each lens which prevents any particle or flying debris from entering the lens tunnels 38 and damaging the lens surfaces.

The lower end plate 14 has an edge flange 40 which lies below the edge surface 36 and along the perimeter of the end plate 14. The peripheral surface of edge flange 40 abuts against the outer sleeve 18, as further described in assembly below.

A fluid valve (not shown) is preferably connected to the fluid inlet and used to control the flow of the fluid entering the cooling system. It can be either an on/off type or a variable control type. The fluid is preferably at a low temperature (see example below) and under high pressure from a remote source not shown.

It is desirable to surround the exterior of the outer sleeve 18 with a heat insulator such as mica, a glass base fabric or a ceramic material to help prevent heat from penetrating into the protective chamber 24 through radiation.

To create an efficient cooling system it is necessary to calculate the quantity of heat absorbed by the system. The protective chamber 24 in this preferred embodiment has a maximum internal temperature of 80 degrees Fahrenheit. The inner sleeve is 7 inches long and has a diameter of 8 inches. The end plates 12, 14 have an area of 50.24 sq. in. each. The total surface area of the assembled cooling unit is 1.91 sq. ft.. The thickness of the end plates is approximately 0.5 inches. The inner sleeve and the two end plates are preferably aluminum.

The cooling fluid used can be cold air or any other cooling gas at a starting temperature of approximately 40 degrees F. The temperature drop of the air going through the above system is approximately 10 degrees F. The cooling fluid must absorb heat transmitted by conductivity and radiation. The ambient temperature of the local welding environment is typically around 450 degrees F. The Coefficient of Conductivity for aluminum is 1.2. There are preferably 20 spiral passages 26 and corresponding distribution passages 32 and merging tubes 34.

Taking the above values and conditions into account and using Stefan-Boltzman Law, the total amount of heat absorbed by the system can be calculated, and from that, the diameter of the spiral passages 26 can be determined.

With the above values, a total air supply of approximately 260 cubic feet per minute will satisfy the desired cooling of the protective chamber 24. The supply of cooling air can be easily generated using a standard air-conditioner and pressure pump. The spiral passages having a diameter of approximately 0.375 inches and the distribution passages 32, the merging tubes 34, and the upper and lower sleeve holes 32a, 34a having a diameter of 0.25 inches provide for a cooling flow with very little friction and absorb the excess heat to keep the protective chamber 24 at a temperature of less than 80 degree F.

The present cooling system 10 is assembled as shown in FIG. 2. The inner sleeve 16 is inserted into the outer sleeve 18 and the lower end plate 14 is attached to the outer sleeve 18 by any functional means such as machine screws or bolts. The end plates can also be attached to the inner sleeve 16 by providing a screw thread along the edge surface 28, 36 of each end plate 12, 14 which engages with corresponding threads provided along the inside wall of the inner sleeve 16. The end plates 12, 14, when secured to the inner sleeve 16 align the distribution passages 32 and the merging tubes 34 with the upper and lower sleeve holes 32a, 34a, respectively.

A sealing ring (not shown) can be used between the lower end plate 14 and the outer sleeve 18 and again between the upper end plate 12 and the outer sleeve 18 to prevent escape of the cooling fluid along that seam.

After the necessary opto-electronics for the vision system are installed within the protective chamber 24, the upper end plate 12 is attached to the upper edge of the outer sleeve 18. The protective chamber 24 is now effectively sealed and protected.

In operation, the cooling fluid is provided under high pressure to the control valve. When the valve permits, the fluid flows through the distribution passages, through the upper sleeve holes 32a and into the spiral passages 26. Excess heat is drawn from the protective chamber 24 to the cooling fluid. The warmer fluid then continues to the lower end of the spiral passages 26 and flows through the lower sleeve holes 34a to the merging tubes. The fluid then exits the merging tubes and flows across both lens surfaces, and finally, exits through the lens tunnels in a turbulent spiral flow. Any heat generated within the protective chamber 24 is drawn by convection through the inner sleeve 16 and carried away from the circuitry with the cooling fluid. The protective chamber 24 is kept at a constant and safe temperature.

Most flying debris kicked up during the welding operation will be blocked by the relatively narrow lens tunnels 38. If any debris or super heated gas enters either lens tunnel 38 having a velocity towards a lens, it will be blown out by the turbulent exhaust flow of the cooling system.

The surface of each lens is further protected and cooled by a stream of cooling fluid. Any dust remaining on the lens when the cooling system is not in operation, i.e. when the robot is shut off and the local environment is at a safe temperature, will be effectively removed by the high pressure stream of cooling fluid shortly after the cooling system is operational.

What is claimed is

1. A housing having a sealed inner chamber wherein opto-electronic circuitry is contained and isolated from the outside environment and an optical interface between said inner chamber and the outside environment, said housing comprising:
   a double walled, cylindrically shaped heat sink attached to said housing and having means forming a plurality of spirally shaped, independent cooling passages within its walls, each spiral passage having an inlet for receiving a cooling fluid and an outlet, said heat sink drawing heat from said housing and transmitting it to said cooling fluid, said cooling fluid flowing through said cooling passages without entering said sealed inner chamber of said housing, said sealed inner chamber thereby retaining a non-turbulent and controlled environment;
   means for directing said cooling fluid from a source to said inlet of each of said spiral passages; and
   means for directing said fluid from said outlet of each spiral passage so that it flows across at last one face of said optical interface, said fluid flow cooling said optical interface and preventing particle contamination thereof.

2. The housing according to claim 1 further comprising a hollow cylindrically shaped, optical interface tunnel extending outward from and substantially perpendicular to said optical interface, said outlet of each spiral passage connected to said so that a turbulent flow of said cooling fluid is expelled from said tunnel which prevents flying particle contaminants from reaching said surface of said joptical interface.

3. The housing according to claim 2, wherein said means for directing said fluid from said outlet of each spiral passage further comprises an end plate attached to said heat sink, said end plate having a least one optical interface and a plurality of merging passages, each connected to each outlet of said spiral passages, said merging passages positioned adjacent to said optical interface and in such a manner that said cooling fluid is forced into a spiral flow across the outside surface of said optical interface within said interface tunnel.

4. The housing according to claim 1 wherein said double walled cylindrically shaped heat sink comprises an inner sleeve and an outer sleeve, said inner sleeve has a plurality of spirally shaped grooves disposed along its outside surface and slidably fits into said outer sleeve which covers and isolates each of said spiral grooves and defines said plurality of spirally shaped, independent cooling passages.

5. A housing having an inner chamber wherein opto-electronic circuitry is contained and an optical interface between said inner chamber and the outside environment, said housing comprising;
   a double walled, cylindrically shaped heat sink attached to said housing and having means forming a plurality of spirally shaped, independent cooling passages within its walls, each spiral passage having an inlet for receiving a cooling fluid and an outlet, said heat sink drawing heat from said housing and transmitting it to said cooling fluid;
   means for directing said cooling fluid from a source to said inlet of each of said spiral passages; and
   means for directing said fluid from said outlet of each spiral passage so that it flows across at least one face of said optical interface in a spiral motion, said spiral fluid flow cooling said optical interface and preventing particle contamination thereof.

6. The housing according to claim 5 further comprising a hollow cylindrically shaped, optical interface tunnel extending outward from and substantially perpendicular to said optical interface, said outlet of each spiral passage connected to said tunnel so that a turbulent flow of said cooling fluid is expelled from said tunnel which prevents flying particle contaminants from reaching said surface of said optical interface.

7. The housing according to claim 5 wherein said means for directing said cooling fluid from a source to said inlet comprises an end plate attached to said heat sink and having a central inlet and a plurality of distribution passages which connect to said inlet of each spiral passage and direct said cooling fluid from said central inlet to each spiral passage.

8. The housing according to claim 6, wherein said means for directing said fluid from said outlet of each spiral passage further comprises an end plate attached to said heat sink, said end plate having a least one optical interface and a plurality of merging passages, each connected to each outlet of said spiral passages, said merging passages positioned adjacent to said optical interface and in such a manner that said cooling fluid is forced into a spiral flow across the outside surface of said optical interface within said interface tunnel.

9. The housing according to claim 5 wherein said double walled cylindrically shaped heat sink comprises an inner sleeve and an outer sleeve, said inner sleeve has a plurality of spirally shaped grooves disposed along its outside surface and slidably fits into said outer sleeve which covers and isolates each of said spiral grooves and defines said plurality of spirally shaped, independent cooling passages.

* * * * *